US012599903B2

(12) United States Patent
Nakamura et al.

(10) Patent No.: US 12,599,903 B2
(45) Date of Patent: Apr. 14, 2026

(54) LEUKOCYTE TRAPPING APPARATUS

(71) Applicants: NOK CORPORATION, Tokyo (JP); National University Corporation Ibaraki University, Ibaraki (JP)

(72) Inventors: Asako Nakamura, Ibaraki (JP); Kenta Takahashi, Ibaraki (JP); Takayuki Komori, Kanagawa (JP)

(73) Assignees: NOK CORPORATION, Tokyo (JP); NATIONAL UNIVERSITY CORPORATION IBARAKI UNIVERSITY, Ibaraki (JP)

( * ) Notice: Subject to any disclaimer, the term of this patent is extended or adjusted under 35 U.S.C. 154(b) by 500 days.

(21) Appl. No.: 18/029,034

(22) PCT Filed: Sep. 10, 2021

(86) PCT No.: PCT/JP2021/033343
§ 371 (c)(1),
(2) Date: Mar. 28, 2023

(87) PCT Pub. No.: WO2022/070841
PCT Pub. Date: Apr. 7, 2022

(65) Prior Publication Data

US 2023/0364613 A1 Nov. 16, 2023

(30) Foreign Application Priority Data

Sep. 29, 2020 (JP) ................................ 2020-163378

(51) Int. Cl.
*B01L 3/00* (2006.01)
*C12M 3/06* (2006.01)

(52) U.S. Cl.
CPC . *B01L 3/502761* (2013.01); *B01L 2200/0647* (2013.01); *B01L 2300/0809* (2013.01)

(58) Field of Classification Search
None
See application file for complete search history.

(56) References Cited

U.S. PATENT DOCUMENTS

2004/0229349 A1 11/2004 Daridon
2005/0106756 A1 5/2005 Blankenstein et al.
(Continued)

FOREIGN PATENT DOCUMENTS

CN 102360010 A 2/2012
CN 205067292 3/2016
(Continued)

OTHER PUBLICATIONS

Decision to Grant a Patent issued in JP Patent Application No. 2022-553758, dated Feb. 20, 2024.
(Continued)

*Primary Examiner* — Elizabeth A Robinson
*Assistant Examiner* — Brittany I Fisher
(74) *Attorney, Agent, or Firm* — GREENBLUM & BERNSTEIN, P.L.C.

(57) ABSTRACT

A leukocyte trapping apparatus configured so: a chip having protruding parts arranged on a flat part, a blood-containing solution that enters through an inlet port is allowed to pass through the surface of the flat part and through spaces between two adjacent protruding parts in the chip and is discharged through a discharge port; the protruding parts are arranged in layers on the flat part, each layer containing a plurality of the protruding parts, and the blood-containing solution that has passed through a layer located on the inlet port side passes through another layer that is adjacent to the layer on the discharge port side; a trapping part and a bypass part are between two adjacent protruding parts in each layer;
(Continued)

and the trapping part is on the discharge port side of the bypass part in a specific layer as a portion of another layer adjacent to the specific layer.

4 Claims, 9 Drawing Sheets

(56) References Cited

U.S. PATENT DOCUMENTS

| | | | |
|---|---|---|---|
| 2007/0059781 A1 | 3/2007 | Kapur et al. | |
| 2009/0194420 A1 | 8/2009 | Mariella, Jr. et al. | |
| 2011/0045994 A1* | 2/2011 | Voldman | G01N 33/5005 506/10 |
| 2012/0025288 A1 | 2/2012 | Doris et al. | |
| 2012/0138540 A1 | 6/2012 | Kim et al. | |
| 2012/0148140 A1 | 6/2012 | Di Carlo et al. | |
| 2016/0199837 A1* | 7/2016 | Breinlinger | B01L 3/50273 435/308.1 |
| 2016/0313332 A1 | 10/2016 | Lee et al. | |
| 2019/0247030 A1 | 8/2019 | Liu et al. | |
| 2020/0283722 A1 | 9/2020 | Komori et al. | |

FOREIGN PATENT DOCUMENTS

| | | | |
|---|---|---|---|
| CN | 105462834 | | 4/2016 |
| CN | 111212900 | | 5/2020 |
| JP | 2003-102710 | | 4/2003 |
| JP | 2005-140790 | | 6/2005 |
| JP | 2009-509143 | A | 3/2009 |
| JP | 2009-109232 | A | 5/2009 |
| JP | 2010-042020 | | 2/2010 |
| JP | 2012-88055 | A | 5/2012 |
| JP | 2017-000921 | | 1/2017 |
| JP | 2019-508050 | A | 3/2019 |
| JP | 2019-154241 | | 9/2019 |
| WO | 2004038368 | A2 | 5/2004 |
| WO | WO 2017/161210 | A1 | 9/2017 |

OTHER PUBLICATIONS

Chinese Office Action received in CN Patent Application No. 202180054466.8, dated Mar. 17, 2025, and English language translation thereof.

ISR for PCT/JP2021/033343, dated Oct. 26, 2021 (w/ translation).

* cited by examiner

LEUKOCYTE TRAPPING APPARATUS

TECHNICAL FIELD

The present invention relates to a leukocyte trapping apparatus.

BACKGROUND ART

DNA is damaged by radiation exposure or due to living environment. It is said that the damaged DNA is closely related to diseases such as cancers. A method which includes centrifuging a 5-ml portion of blood to extract leukocytes, staining the extracted leukocytes, and then observing on a glass slide is conventionally adopted to analyze the damaged DNA.

A micro flow path for trapping fine particles such as leukocytes has heretofore been proposed (see Patent Document 1). Patent Document 1 discloses a micro flow path apparatus having a filter function in which solid particles having a predetermined size or larger are only trapped and separated from a solid-liquid mixture with the use of the micro flow path having concave trapping parts. The object of Patent Document 1 is that one trapping part accommodates one or more solid particles having the predetermined size or larger so that solid particles having the predetermined size or larger are completely trapped before the distal end of a separator having the plurality of trapping parts disposed therein, and Patent Document 1 does not consider trapping only one solid particle in a single trapping part so that the trapped solid particle such as a leukocyte may be easily observed. It is also necessary for the solid-liquid mixture to always flow from an inlet to an outlet of the micro flow path to prevent solid particles once trapped in the trapping parts from refloating and flowing out of the trapping parts.

CITATION LIST

Patent Documents

Patent Document 1: JP 2009-109232 A

SUMMARY OF THE INVENTION

Problem to be Solved by the Invention

However, the conventional method requires blood in an amount as large as 5 ml and is hence invasive. The conventional method also requires a large-sized device such as a centrifugal separator. Therefore, it is difficult to use in Point Of Care Testing (POCT) as in on-site analysis.

Further, in a case where the method aims at separating solid components having a specific size such as leukocytes from a solid-liquid mixture such as a blood-containing liquid by trapping parts, placing therein, and analyzing on site, the concave trapping parts of the micro flow path described in Patent Document 1 are low in trapping efficiency of solid components such as leukocytes.

An object of the present invention is to solve the problem as described above. More specifically, an object of the present invention is to provide a leukocyte trapping apparatus which does not require a large-sized device such as a centrifugal separator, in which the amount of blood to be needed can be reduced to an amount as small as about 1 μl, and which has a higher trapping efficiency than in the conventional technique.

Means for Solving the Problem

The present invention provides the following (1) and (4).

(1) A leukocyte trapping apparatus including: a chip for passing a blood-containing liquid therethrough and trapping leukocytes contained in the blood-containing liquid,

- wherein the chip has a flat part and a large number of protruding parts provided thereon, and is configured so that the blood-containing liquid having entered through an inlet passes on a surface of the flat part in the chip, and through spaces each located between a protruding part and another protruding part adjacent thereto and is discharged from an outlet,
- wherein the protruding parts are provided on the flat part in a layered form, each layer has a plurality of protruding parts, and the protruding parts are configured so that the blood-containing liquid having passed through a layer on an inlet side passes through a layer adjacent thereto on an outlet side,
- wherein trapping parts and bypass parts are formed in each layer, each of the trapping parts having a width set to 2 to 7.5 μm between a protruding part and another protruding part adjacent thereto, and each of the bypass parts having a width set to 8 to 20 μm therebetween,
- wherein chamfering is made so that a width between inlet side portions on the inlet side of two protruding parts constituting one trapping part is gradually reduced toward a bottom of the trapping part, and
- wherein trapping parts are disposed so as to face the outlet side of all or some bypass parts in a specific layer as part of another layer adjacent thereto.

(2) The leukocyte trapping apparatus according to (1) above, wherein a width between the specific layer and the another layer adjacent thereto is 8 to 30 μm.

(3) The leukocyte trapping apparatus according to (1) or (2), wherein a ratio of a bypass part width to a trapping part width is more than 1 but not more than 3.

(4) The leukocyte trapping apparatus according to any one of (1) to (3), wherein portions of the protruding parts at their inlet side end faces except the trapping parts extend parallel to a layer direction, and end faces of the protruding parts constituting the bypass parts extend in a direction perpendicular to the layer direction.

Effect of the Invention

The present invention can provide a leukocyte trapping apparatus which does not require a large-sized device such as a centrifugal separator, in which the amount of blood to be needed can be reduced to an amount as small as about 1 μl, and which has a higher trapping efficiency than in the conventional technique.

DESCRIPTION OF EMBODIMENTS

A leukocyte trapping apparatus of the invention is described.

The leukocyte trapping apparatus of the invention is a leukocyte trapping apparatus including: a chip for passing a blood-containing liquid therethrough and trapping leukocytes contained in the blood-containing liquid, wherein the chip has a flat part and a large number of protruding parts provided thereon, and is configured so that the blood-containing liquid having entered through an inlet passes on a surface of the flat part in the chip, and through spaces each located between a protruding part and another protruding part adjacent thereto and is discharged from an outlet, wherein the protruding parts are provided on the flat part in a layered form, each layer has a plurality of protruding parts, and the protruding parts are configured so that the blood-containing liquid having passed through a layer on an inlet side passes through a layer adjacent thereto on an outlet side, wherein trapping parts and bypass parts are formed in each layer, each of the trapping parts having a width set to 2 to 7.5 μm between a protruding part and another protruding part adjacent thereto, and each of the bypass parts having a width set to 8 to 20 μm therebetween, wherein chamfering is made so that a width between inlet side portions on the inlet side of two protruding parts constituting one trapping part is gradually reduced toward a bottom of the trapping part, and wherein trapping parts are disposed so as to face the outlet side of all or some bypass parts in a specific layer as part of another layer adjacent thereto.

The leukocyte trapping apparatus of the invention is described with reference to the drawings.

Figure 1:
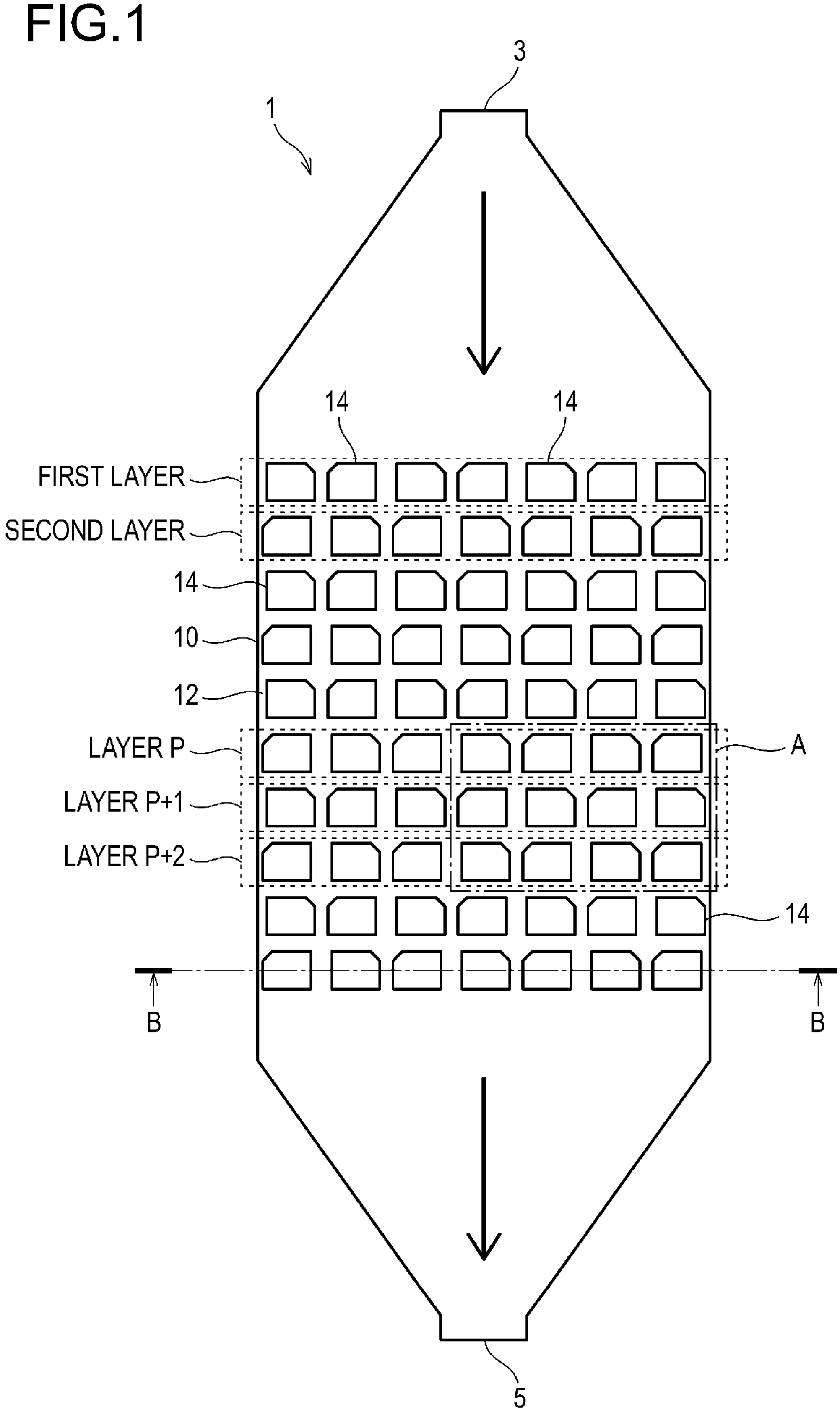
FIG. 1 is a schematic view of a chip surface of a leukocyte trapping apparatus in a preferred embodiment of the invention.
Figure 2:
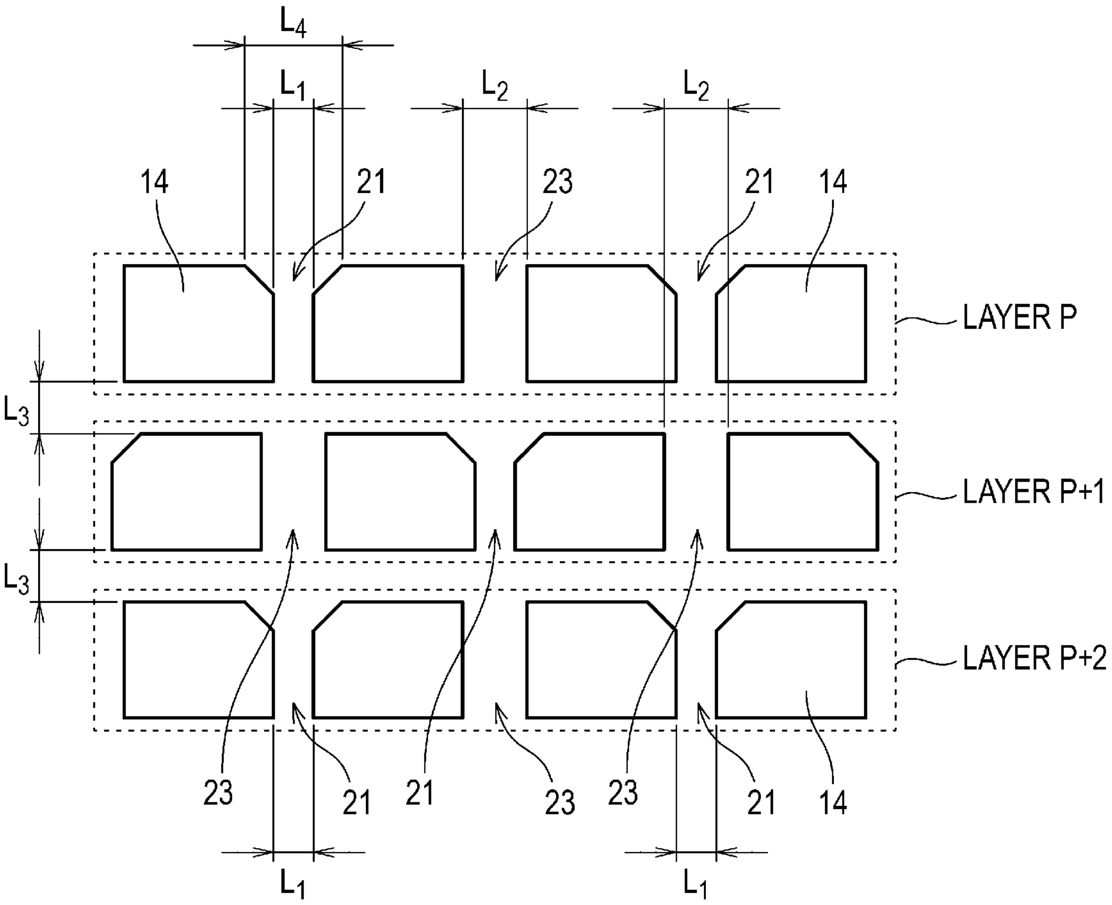
FIG. 2 is an enlarged view of a portion A in FIG. 1.
Figure 3:
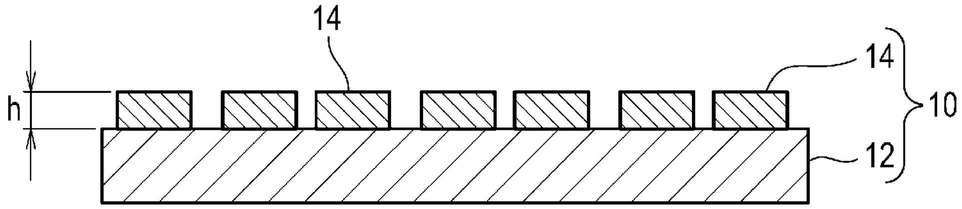
FIG. 3 is a cross-sectional view taken along line B-B in FIG. 1.

FIG. 1 is a schematic view showing a leukocyte trapping apparatus 1 of the invention. FIG. 2 is an enlarged view of a portion A in FIG. 1. FIG. 3 is a cross-sectional view taken along line B-B in FIG. 1.

The leukocyte trapping apparatus 1 of the invention illustrated in FIG. 1 includes a chip 10, an inlet 3 for supplying a blood-containing liquid to the chip 10, and an outlet 5 from which the blood-containing liquid having passed through the chip 10 is discharged. The configuration of the leukocyte trapping apparatus of the invention is not limited to the one illustrated in FIG. 1 but, for instance, the whole of the leukocyte trapping apparatus 1 of the invention shown in FIG. 1 may be covered with a casing.

As shown in FIG. 1 to FIG. 3, the chip 10 in the leukocyte trapping apparatus 1 of the invention includes a flat part 12 and a large number of protruding parts 14 provided thereon.

In the leukocyte trapping apparatus 1 of the invention as described above, the blood-containing liquid having entered through the inlet 3 flows toward the outlet 5 by the action of a pump, hydrostatic pressure, electroosmotic flow or the like. During this process, the blood-containing liquid flows on a surface of the flat part 12 in the chip 10, and through spaces each located between a protruding part 14 and another protruding part 14 adjacent thereto, and leukocytes are caught and trapped between specific protruding parts 14.

The blood-containing liquid is not particularly limited as long as it is a liquid containing human blood. For example, the blood-containing liquid may be a mixture liquid obtained by adding human blood to a phosphate buffer solution, an anticoagulant, a stain solution or the like. Alternatively, the blood-containing liquid may be human blood itself.

The protruding parts 14 are provided on the flat part 12 in a layered form, as shown in FIG. 1.

FIG. 1 shows a layer closest to the inlet 3 as a first layer, and a layer adjacent to the first layer on the outlet side (downstream side) as a second layer. FIG. 1 also shows a layer as a layer P, a layer adjacent to the layer P on the outlet side (downstream side) as a layer P+1, and a layer further adjacent thereto on the outlet side (downstream side) as a layer P+2.

Each layer contains a plurality of protruding parts 14. FIG. 1 shows an example in which each layer contains seven protruding parts 14. However, the number of the protruding parts 14 contained in each layer is not particularly limited. Further, the number of layers is also not particularly limited.

The blood-containing liquid having entered the leukocyte trapping apparatus 1 of the invention through the inlet 3 flows over the surface of the flat part 12 to first pass through flow paths between the protruding parts 14 in the first layer and then pass through flow paths between the protruding parts 14 in the second layer. The leukocyte trapping apparatus is configured so that the blood-containing liquid flows thereafter in the same manner to pass through flow paths between the protruding parts 14 in the layer P, and then pass through flow paths between the protruding parts 14 in the layer P+1.

As shown in FIG. 2, trapping parts 21 and bypass parts 23 are formed in each layer, each trapping part 21 having a width (flow path width) $L_1$ set to 2 to 7.5 μm between a protruding part 14 and its adjacent protruding part 14, and each bypass part 23 having a width $L_2$ set to 8 to 20 μm therebetween.

In the example of FIG. 2, in each layer of the layer P, the layer P+1, and the layer P+2, the trapping parts 21 and the bypass parts 23 are alternately formed as flow paths between the plurality of protruding parts 14. In the leukocyte trapping apparatus of the invention, however, the trapping parts and the bypass parts formed in each layer may not be alternately formed as in FIG. 2. For instance, a plurality of trapping parts may be successively present in each layer.

Further, a trapping part 21 is disposed on an outlet side of a bypass part 23 in a specific layer as a part of another layer adjacent thereto. In other words, in the example of FIG. 2, a trapping part 21 in the layer P+1 is disposed on the outlet side (downstream side) of a bypass part 23 in the layer P.

As illustrated in FIG. 2, a bypass part 23 in the layer P and a trapping part 21 in the layer P+1 are preferably disposed side by side in a direction perpendicular to the layer direction. More specifically, the bypass part 23 in the layer P and the trapping part 21 in the layer P+1 are preferably disposed so that, when a line in a direction perpendicular to the layer direction is drawn, the line passes through the bypass part 23 in the layer P and the trapping part 21 in the layer P+1 (in other words, the line does not come into contact with the protruding parts 14).

In the example shown in FIG. 1 and FIG. 2, leukocytes which are contained in the blood-containing liquid having flowed from the inlet side (upstream side) to reach the layer P are in principle not allowed to pass through the trapping parts 21 and at least some of the leukocytes are therefore trapped in the trapping parts 21 of the layer P. When the leukocytes are trapped, the trapping parts 21 are closed. On the other hand, components other than the leukocytes (erythrocytes, thrombocytes, and the like) pass through the trapping parts 21 in the layer P to reach the layer P+1. Further, all the components which are contained in the blood-containing liquid having reached the layer P are allowed to pass through the bypass parts 23. Therefore, leukocytes which could not be trapped in the trapping parts 21 of the layer P pass through the bypass parts 23 in the layer P to reach the layer P+1, and at least some of them are trapped in the trapping parts 21 of the layer P+1. As the trapping parts 21 in the layer P+1 are disposed on the outlet side (downstream side) of the bypass parts 23 in the layer P, the leukocytes having passed through the bypass parts 23 in the layer P are easily trapped in the trapping parts 21 of the layer P+1.

In plan views as shown in FIG. 1 and FIG. 2, each protruding part 14 preferably has a rectangular or approximately rectangular shape (a rectangular-based shape in which part of edges in four corners are linearly cut off to be chamfered, or a shape rounded by grinding at least part of edges in four corners of a rectangle). The chamfered portion which is linearly cut off and the chamfered portion which is ground to have a round shape preferably each have a smaller area than the area (projected area) of a leukocyte to be trapped.

Further, as illustrated in FIG. 2, inlet side portions in two protruding parts 14 constituting a trapping part 21 are chamfered so that the trapping part 21 is continuously and gradually narrowed toward its bottom, because in this case leukocytes are easily trapped in the trapping parts and leukocytes once trapped in the trapping parts are fitted into the chamfered portions in a deformed shape and are therefore less likely to flow out of the trapping parts.

The angle of the line formed by chamfering is preferably 30 to 60° with respect to the direction perpendicular to the layer direction (direction from the inlet toward the outlet). In a case where chamfering is not linear but is, for example, spoon-shaped chamfering or round chamfering, the tangent line preferably forms an average angle of 30 to 60°. When this angle is smaller than 30°, leukocytes tend to flow into the bypass parts 23 at a higher rate to lower the trapping efficiency. When this angle is larger than 60°, the possibility that a plurality of leukocytes are trapped in a single trapping part 21 tends to be increased.

If a trapping part 21 is gradually narrowed toward its bottom, both inlet side portions of two protruding parts constituting the trapping part may be chamfered or only one inlet side portion may be chamfered. When both the inlet side portions are chamfered, the chamfering angle may be the same or different.

In a case where the protruding parts 14 have a rectangular or approximately rectangular shape, other leukocytes that reached the trapping parts 21 already having fine particles trapped therein move in the layer direction along the end faces of the protruding parts 14 and move from the bypass parts 23 to the adjacent layer on the downstream side, where the leukocytes are easily trapped in the trapping parts 21. Consequently, the inventors have found that the leukocyte trapping efficiency is increased.

In particular, when as in the case shown in FIG. 2, the inlet side portions of the two protruding parts 14 constituting the trapping part 21 are chamfered (preferably linearly chamfered) so that the trapping part 21 is continuously and gradually narrowed toward its bottom, portions of the protruding parts 14 at their inlet side end faces except the trapping parts 21 extend parallel to the layer direction, and the bypass parts 23 extend in the direction perpendicular to the layer direction, this effect is prominent and the leukocyte trapping efficiency is further increased, and this case is therefore preferable.

In a case where the protruding parts 14 do not have a rectangular or approximately rectangular shape (in the case of a circular shape or an elliptical shape, for example), their outer shape contains R and leukocytes may therefore move along the R instead of moving to the trapping parts 21 in the adjacent layer on the downstream side.

Each of the trapping parts 21 has a width $L_1$ of 2 to 7.5 μm, preferably 3 to 6 μm, and more preferably 4 to 5 μm.

Each of the bypass parts 23 has a width $L_2$ of 8 to 20 μm, preferably 8.5 to 15 μm, and more preferably 9 to 10 μm.

Each of the width $L_1$ and the width $L_2$ means the shortest distance between one protruding part 14 and its adjacent protruding part 14 in each layer.

The ratio ($L_2/L_1$) of the width $L_2$ of the bypass parts 23 to the width $L_1$ of the trapping parts 21 is preferably more than 1 but not more than 3, and more preferably 1.5 to 2.5, because in this case, the flow toward the bypass parts 23 is adequately suppressed, thus facilitating leukocyte trapping in the trapping parts.

The width $L_3$ between the layer P and the layer P+1 is preferably 8 to 30 μm, and more preferably 9 to 10 μm.

The width $L_3$ means the shortest distance between the layer P and the layer P+1.

The maximum width $L_4$ of the trapping part 21 at the chamfered portions on the inlet side is preferably 10 to 35 μm and more preferably 15 to 25 μm.

Each of the protruding parts 14 shown in FIG. 3 preferably has a height h of 8 to 30 μm and more preferably 9 to 15 μm.

The size and the material of the chip are not particularly limited. The chip may be made of, for example, resins such as silicone rubber, acrylic resin, polycarbonate, cyclic olefin polymer, cyclic olefin copolymer, polystyrene, polyethylene, and polyethylene terephthalate, and an embodiment in which resin is bonded to a substrate of glass or the like is preferable.

EXAMPLES

<Preparation of Leukocyte Trapping Apparatus>

Leukocyte trapping apparatuses each having one of six types of chips in which bypass parts and trapping parts had width values shown in Table 1, respectively, were prepared according to the procedure shown below. The width (width $L_3$ in FIG. 2) between a specific layer and another layer adjacent thereto in every leukocyte trapping apparatus was equally set to 10 μm.

First, a spinner was used to uniformly apply a photosensitive resin (SU-8 3050 manufactured by Nippon Kayaku Co., Ltd.) to a surface of a plate-like silicon wafer.

Next, the photosensitive resin was irradiated with ultraviolet light through a specific mask.

Next, the photosensitive resin on the silicon wafer exposed to the ultraviolet light was baked at 95° C.

Next, areas which were not exposed to the ultraviolet light were removed with a developer (SU-8 Developer manufactured by Nippon Kayaku Co., Ltd.) to fabricate a mold.

Next, silicone rubber (SILPOT184 manufactured by Dow Corning Corp.) was flowed into the mold.

Next, the silicone rubber was vulcanized under conditions of 100° C. and 0.5 hours.

Next, the silicone rubber was peeled off from the silicon wafer to form a chip having flow paths formed therein.

Next, portions serving as an inlet and an outlet were perforated with punch holes to form a liquid introduction part, thereby fabricating a leukocyte trapping apparatus.

<Joining>

A light source (L 12530-01 manufactured by Hamamatsu Photonics K.K.) was used to irradiate both a glass substrate having the flow path-formed chip formed therein with vacuum ultraviolet light for 15 seconds. Then, both irradiated surfaces were bonded together to form a chip.

Figure 4:
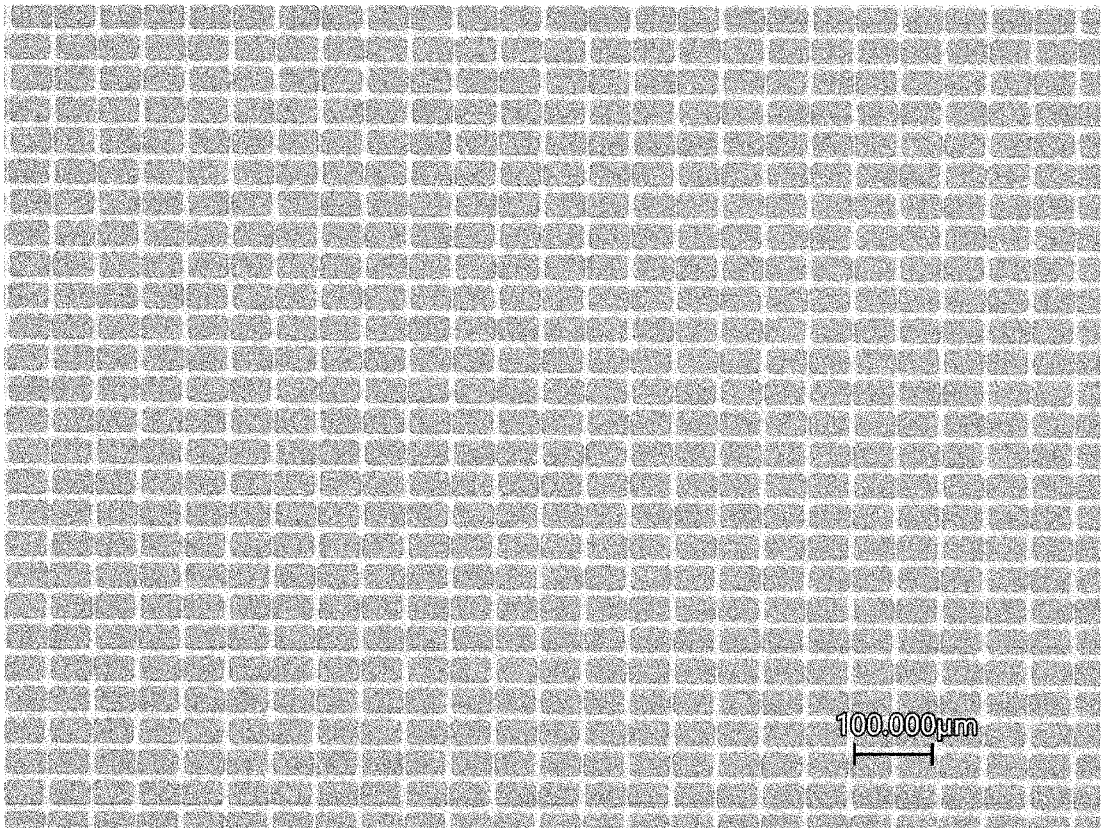
FIG. 4 is an enlarged photo of a surface of a chip used in Examples and Comparative Examples.

The formed chip was observed with a fluorescent microscope and an enlarged photo obtained is shown in FIG. 4.

<Experiments>

Peripheral blood obtained from an adult male was diluted two-fold with PBS (phosphate buffer solution manufactured by Wako Pure Chemical Industries, Ltd.).

Next, a 1 μl to 2 μl portion of the diluted blood was dropped into the inlet of the chip and fed by hydrostatic pressure.

Next, the chip was allowed to stand for 1 hour and then unnecessary blood was removed, and PBS was dropped and fed to thereby remove the other substances than the trapped leukocytes.

Next, the PBS was removed, and a DNA-binding stain solution (DAPI) was dropped and allowed to stand for 30 minutes.

Then, in each of the six types of leukocyte trapping apparatuses, the chip was observed with the fluorescent microscope to see whether or not leukocytes were trapped. The results are shown in Table 1. In Table 1, a case where one leukocyte could be seen in at least one trapping part was rated as "Good" and a case where one-leukocyte trapping could not be seen in every trapping part was rated as "Poor."

Figure 5:
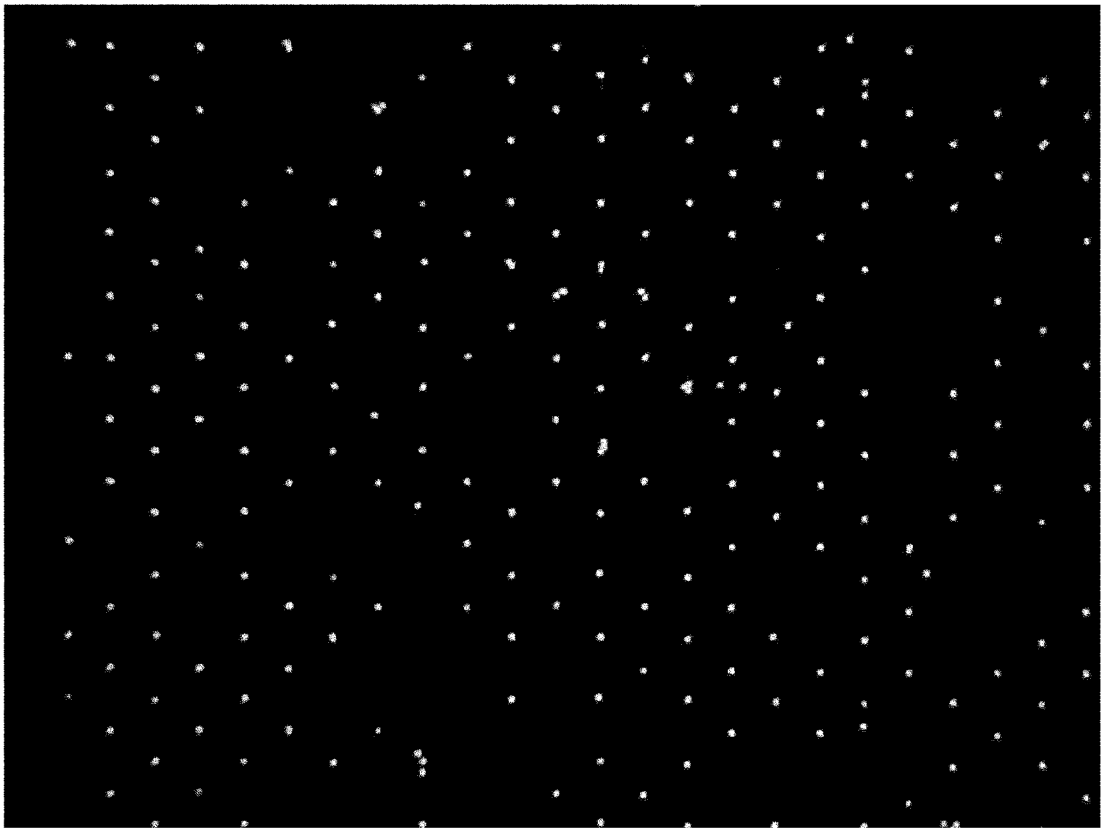
FIG. 5 is an enlarged photo (darkening and fluorescence) of a chip obtained by observing with a fluorescent microscope, the photo showing the state of leukocytes trapped in Example 1.
Figure 6:
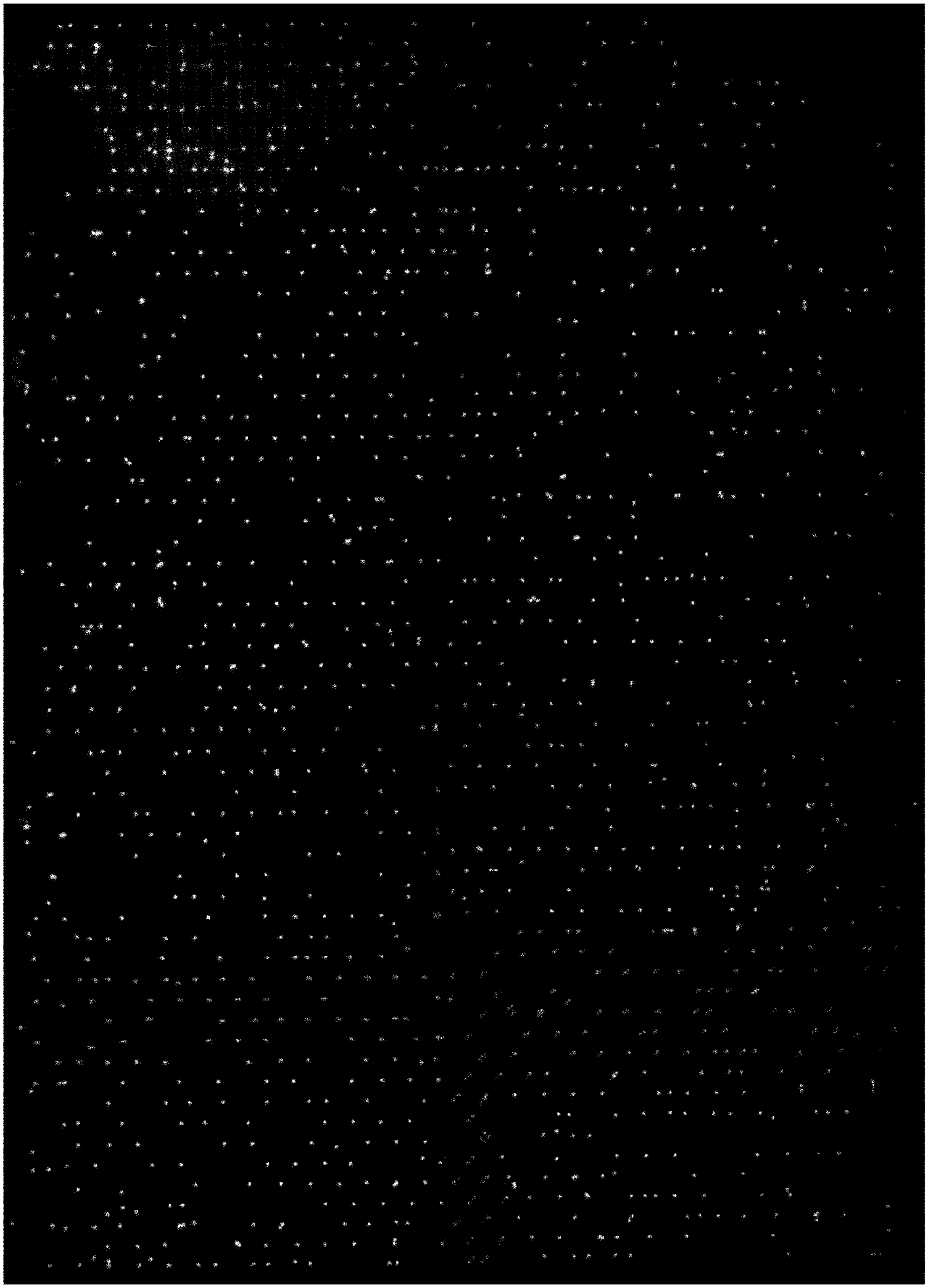
FIG. 6 is an enlarged photo (darkening and fluorescence) of a chip obtained by observing with a fluorescent microscope, the photo showing the state of leukocytes trapped in Example 2.

Enlarged photos under darkening and fluorescence which were obtained by observing the chips in Example 1 and Example 2 with the fluorescent microscope are shown in FIG. 5 and FIG. 6, respectively. The magnification in FIG. 5 is the same as that in FIG. 4. FIG. 6 is an image of the whole of the apparatus. White spots in FIG. 5 and FIG. 6 represent leukocytes. FIG. 5 and FIG. 6 allowed to confirm that one-leukocyte trapping was achieved in Example 1 and Example 2. Example 3 and Example 4 were also subjected to observation with the fluorescent microscope in the same manner as in Example 1 and Example 2, which allowed to confirm that one-leukocyte trapping was achieved.

On the other hand, in Comparative Examples 1 and 2 in which the widths of the trapping parts and the bypass parts were too large, leukocytes could not be sufficiently trapped.

TABLE 1

| | Bypass part width (μm) | Trapping part width (μm) | Trapping result |
|---|---|---|---|
| Example 1 | 10 | 5 | Good |
| Example 2 | 10 | 4 | Good |
| Example 3 | 10 | 7.5 | Good |
| Example 4 | 15 | 5 | Good |
| Comparative Example 1 | 50 | 25 | Poor |
| Comparative Example 2 | 40 | 20 | Poor |

Comparative Evaluation

Figure 7:
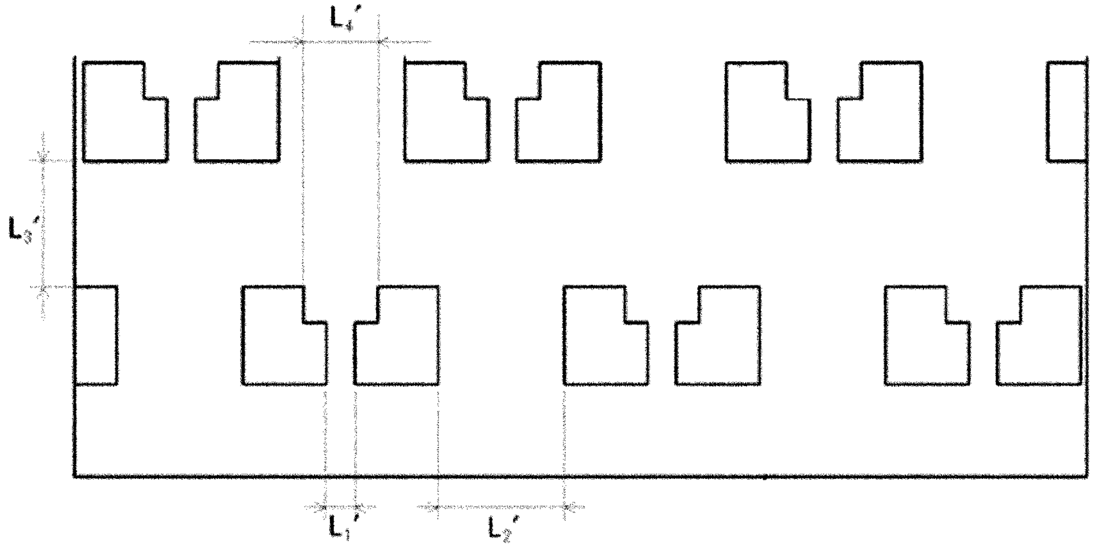
FIG. 7 is a schematic view of trapping parts and bypass parts in a conventional micro flow path apparatus.

For the purpose of comparing the leukocyte trapping efficiency in the leukocyte trapping apparatus according to the invention with the conventional technique, a leukocyte trapping apparatus according to the invention and a micro flow path apparatus as described in Patent Document 1 which had conventional concave trapping parts were prepared and comparative evaluation experiments were performed. A schematic view of the trapping parts and bypass parts of the micro flow path apparatus are shown in FIG. 7.

Two indexes shown in [Formula 1] and [Formula 2] were adopted as those for evaluating trapping efficiency.

Ratio of trapping parts under single trapping (%)=[Number of trapping parts under single trapping]/[Number of trapping parts within observation range]×100 [Formula 1]

Ratio of singly trapped leukocytes (%)=[Number of singly trapped leukocytes]/[Number of leukocytes present within observation range]×100 [Formula 2]

The number of trapping parts within observation range represents the number of trapping parts present within the observation range that was set in each of the leukocyte trapping apparatus and the micro flow path apparatus which were to be subjected to comparative evaluation. The number of trapping parts under single trapping represents the number of trapping parts within the observation range each having only one leukocyte trapped therein. The number of singly trapped leukocytes represents the number of leukocytes singly trapped in individual trapping parts within the observation range and is equal to the number of trapping parts under single trapping. The number of leukocytes present within observation range represents the number of all leukocytes present within the observation range, and includes not only leukocytes singly trapped in the trapping parts but also leukocytes in cases where a plurality of leukocytes are trapped in individual trapping parts, and leukocytes present in the flow paths other than the trapping parts.

Figure 8A:
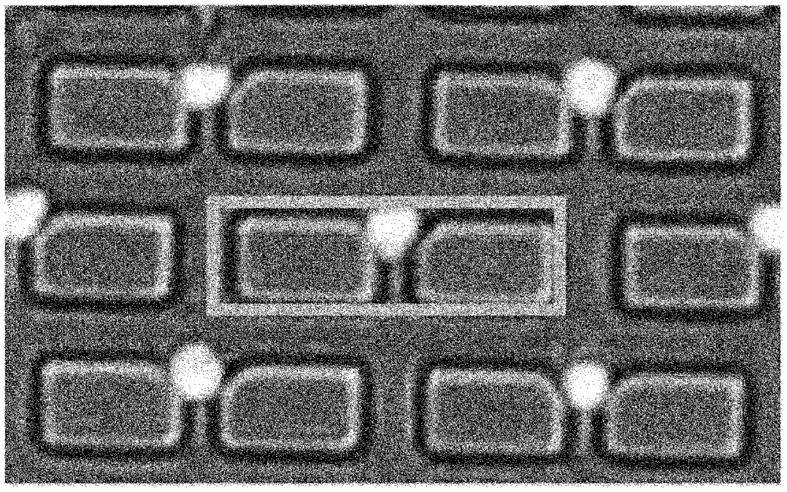
FIGS. 8A and 8B are each a diagram showing a boundary of a trapping part for trapping determination.
Figure 8B:
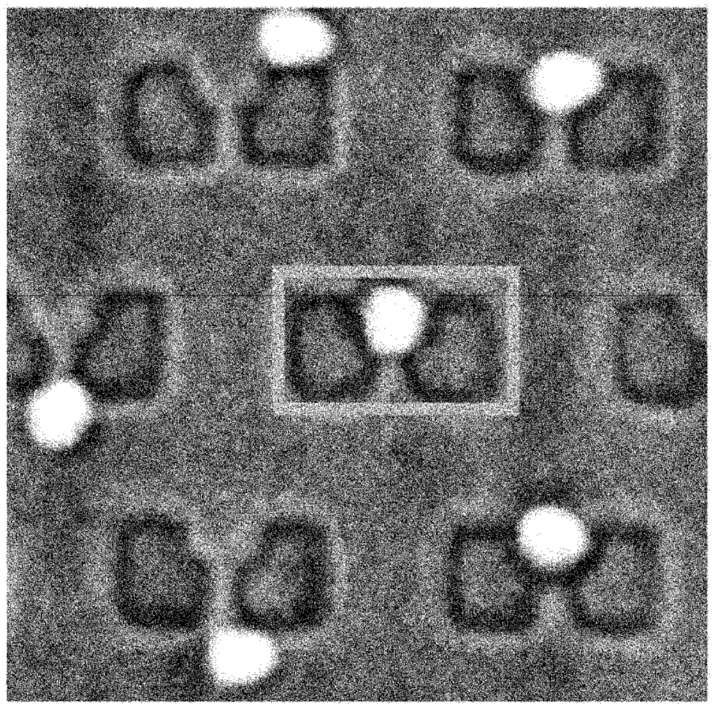

As to whether or not a leukocyte is trapped in a trapping part, in a trapping part of the leukocyte trapping apparatus according to the invention shown in FIG. 8A and a trapping part of the conventional micro flow path apparatus shown in FIG. 8B, the leukocyte is determined to be trapped if the leukocyte partially enters the interior of each of minimum rectangles which surrounds a pair of protruding parts constituting one trapping part, the rectangles being shown in the drawings by red lines, respectively.

The reasons for which these indexes were adopted as indexes for evaluating the trapping efficiency are as follows:

In fluorescent image analysis for DNA damage evaluation which is assumed as a scene where the leukocyte trapping apparatus according to the invention is utilized, in consideration of automatic image analysis with an image processing program or the like, leukocytes singly trapped in individual trapping parts are desirably present within one field of view in the fluorescent microscope or the like used for analysis, in the largest possible number which is at least not less than the number necessary for analysis. Further, in consideration of ease of creation of the image processing program, it is desirable for leukocytes not to remain in the flow paths other than the trapping parts at a point in time when separation and alignment have been completed.

In other words, in order to evaluate the two desirable properties described above, the two indexes which are the ratio of trapping parts under single trapping (ratio of trapping parts each having only one leukocyte trapped therein to trapping parts within the observation range) and the ratio of singly trapped leukocytes (ratio of leukocytes singly trapped in individual trapping parts to leukocytes trapped within the observation range) were used as the indexes for evaluating the trapping efficiency.

<Preparation of Leukocyte Trapping Apparatus and Micro Flow Path Apparatus>

A chip which included a leukocyte trapping apparatus according to the invention was prepared as Example 5 according to the same procedure as in Examples 1 to 4 described above, and a chip which included a micro flow path apparatus having concave trapping parts was prepared as Comparative Example 3 according to the same procedure. Sizes of trapping parts, bypass parts and the like of each chip are shown in Table 2. $L_1$ in FIG. 2 and $L_1'$ in FIG. 7 represent the trapping part widths, respectively; $L_2$ in FIGS. 2 and $L_2'$ in FIG. 7 represent the bypass part widths, respectively; $L_3$ in FIGS. 2 and $L_3'$ in FIG. 7 represent the distances between layers, respectively; and LA in FIG. 2 and $L_4'$ in FIG. 7 represent the maximum widths of the trapping parts at their inlet side portions, respectively.

TABLE 2

| | Trapping part width (μm) | Bypass part width (μm) | Distance between layers (μm) | Maximum width of trapping part at inlet side portion (μm) |
|---|---|---|---|---|
| Example 5 | 5 | 10 | 10 | 20 |
| Comparative Example 3 | 5 | 20 | 20 | 12 |

<Experiments>

Experiments were performed according to the same procedure as in Examples 1 to 4 described above.

Figure 9A:
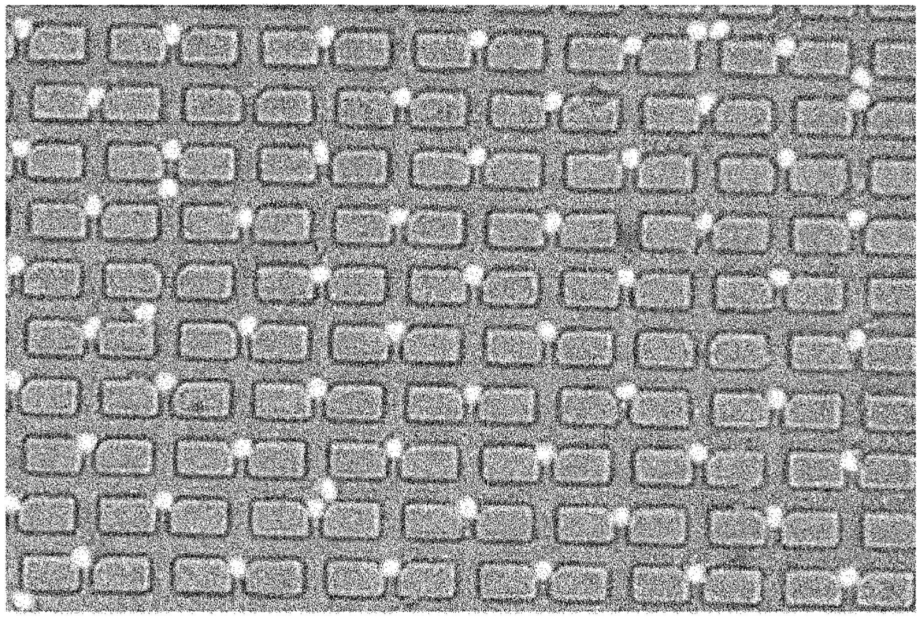
FIGS. 9A and 9B are each an enlarged photo of a chip obtained by observing with a fluorescent microscope, the photo showing the state of leukocytes trapped in comparative evaluation experiments.
Figure 9B:
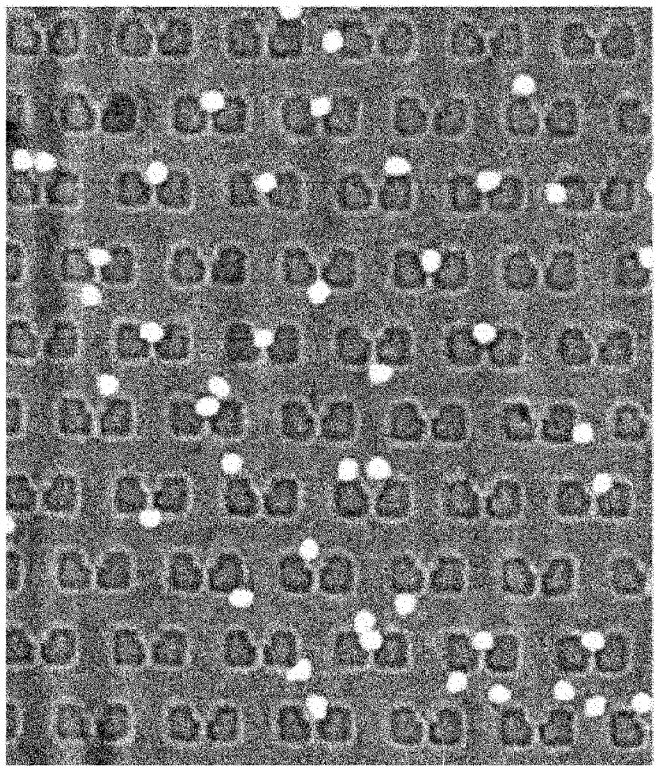

The chips of two types were observed with the fluorescent microscope, and in each observation range containing the same number of trapping parts, the number of trapping parts present within the observation range, the number of leukocytes present within the observation range, and the number of singly trapped leukocytes (number of trapping parts under single trapping) were counted, respectively, to evaluate the trapping efficiency using Formula 1 and Formula 2. The trapping efficiency of each chip is shown in Table 3. The state of leukocytes trapped within the observation range of the chip in the leukocyte trapping apparatus of the invention is shown in FIG. 9A and the state of leukocytes trapped within the observation range of the chip in the conventional micro flow path apparatus is shown in FIG. 9B. In each drawing, each fluorescent particle is a leukocyte.

TABLE 3

| | Number of leukocytes within observation range (A) | Number of singly trapped leukocytes (number of trapping parts under single trapping) (B) | Ratio of trapping parts under single trapping (B/N × 100)(%) | Ratio of singly trapped leukocytes (B/A × 100)(%) | Number of trapping parts (N) |
|---|---|---|---|---|---|
| Example 5 | 64 | 57 | 95 | 89 | 60 |
| Comparative Example 3 | 45 | 16 | 27 | 36 | 60 |

As shown in Table 3, the experiments for the comparative evaluation revealed that the ratio of trapping parts under single trapping and the ratio of singly trapped leukocytes in Example 5 were higher by 68% and 53%, respectively, compared to those in Comparative Example 3, and allowed to confirm that, in the leukocyte trapping apparatus of the invention, the trapping efficiency of solid components such as leukocytes was extremely high compared to that in the conventional method.

It is presumed that this difference is caused by the fact that chamfering is made so that the width between the inlet side portions on the inlet side of the two protruding parts constituting the trapping part of the invention is gradually reduced toward the bottom of the trapping part, thereby having the effect of sandwiching a cell pushed toward the bottom of the trapping part from both sides by the action of hydrostatic pressure as compared to the concave structure as in the trapping part in the conventional technique, and detachment of cells once trapped and trapping of plural cells in a single trapping part are less likely to occur.

This application claims priority based on Japanese Patent Application No. 2020-163378 filed on Sep. 29, 2020, the entire disclosure of which is incorporated herein by reference.

REFERENCE SIGNS LIST

1 leukocyte trapping apparatus of the invention
3 inlet
5 outlet
10 chip
12 flat part
14 protruding part
21 trapping part
23 bypass part

The invention claimed is:

1. A leukocyte trapping apparatus comprising: a chip for passing a blood-containing liquid therethrough and trapping leukocytes contained in the blood-containing liquid, wherein the chip has a flat part and a first plurality of protruding parts provided thereon, and is configured so that the blood-containing liquid having entered through an inlet passes on a surface of the flat part in the chip, and through spaces each located between a protruding part and another protruding part adjacent thereto and is discharged from an outlet, wherein the first plurality of protruding parts is provided on the flat part and forms a plurality of layers, each layer has a second plurality of protruding parts that is a subset of the first plurality of protruding parts, and the first plurality of protruding parts is configured so that the blood-containing liquid having passed through a layer on an inlet side passes through a another layer adjacent thereto on an outlet side, wherein, in a direction perpendicular to the flat part of the chip, each protruding part of the first plurality of protruding parts has a generally rectangular shape in which part of edges in four corners are linearly cut off to be a chamfered portion, wherein, in a direction parallel to the flat part of the chip, a surface of each protruding part of the first plurality of protruding parts has a pentagonal shape, wherein trapping parts and bypass parts are formed in each layer, each of the trapping parts having a width set to 2 to 7.5 μm between the protruding part and the another protruding part adjacent thereto, and each of the bypass parts having a width set to 8 to 20 μm therebetween, wherein the chamfered portion is made so that a width between inlet side portions on the inlet side of two protruding parts constituting one trapping part is gradually reduced toward a bottom of the trapping part, and wherein the trapping parts are disposed so as to face the outlet side of all or some of the bypass parts in a specific layer as part of another layer adjacent thereto.

2. The leukocyte trapping apparatus according to claim 1, wherein a width between the specific layer and the another layer adjacent thereto is 8 to 30 μm.

3. The leukocyte trapping apparatus according to claim 1, wherein a ratio of a bypass part width to a trapping part width is more than 1 but not more than 3.

4. The leukocyte trapping apparatus according to claim 1, wherein portions of the protruding parts at their inlet side end faces except the trapping parts extend parallel to a layer direction, and end faces of the protruding parts constituting the bypass parts extend in a direction perpendicular to the layer direction.

* * * * *